US012728614B2

(12) United States Patent
Chess et al.

(10) Patent No.: US 12,728,614 B2
(45) Date of Patent: Sep. 8, 2026

(54) DUNNAGE DEVICE WITH TAG-TEARING PREVENTION

(71) Applicant: Pregis LLC, Bannockburn, IL (US)

(72) Inventors: Ken Chess, Hinsdale, IL (US); David Joyce, Naperville, IL (US)

(73) Assignee: Pregis LLC, Chicago, IL (US)

(*) Notice: Subject to any disclaimer, the term of this patent is extended or adjusted under 35 U.S.C. 154(b) by 0 days.

(21) Appl. No.: 18/961,212

(22) Filed: Nov. 26, 2024

(65) Prior Publication Data

US 2025/0170796 A1 May 29, 2025

Related U.S. Application Data

(60) Provisional application No. 63/665,181, filed on Jun. 27, 2024, provisional application No. 63/604,166, filed on Nov. 29, 2023.

(51) Int. Cl.
*B31D 5/00* (2017.01)

(52) U.S. Cl.
CPC .... *B31D 5/0043* (2013.01); *B31D 2205/0047* (2013.01); *B31D 2205/0058* (2013.01)

(58) Field of Classification Search
CPC ................ B31D 5/0043; B31D 5/0052; B31D 2205/007; B31D 2205/0088; B31D 2205/0058; B31D 2205/0047
See application file for complete search history.

(56) References Cited

U.S. PATENT DOCUMENTS 4,750,896 A 6/1988 Komaransky et al.
4,983,063 A 1/1991 Phillips
5,105,703 A 4/1992 Kondo
5,123,889 A 6/1992 Armington et al.
5,203,083 A 4/1993 Domonoske
5,322,477 A 6/1994 Armington et al.
5,593,376 A 1/1997 Armington et al.
(Continued)

FOREIGN PATENT DOCUMENTS

DE 69714026 T2 2/2003
DE 10204506 A1 8/2003
(Continued)

OTHER PUBLICATIONS

International Search Report and Written Opinion for International Application No. PCT/US24/57555, filed Nov. 26, 2024, mailed May 2, 2025.

*Primary Examiner* — Thomas M Wittenschlaeger
(74) *Attorney, Agent, or Firm* — Fox Rothschild LLP

(57) ABSTRACT

Dunnage conversion machines can include a drive mechanism that deforms a stock material into a continuous length of dunnage, a cutting device that severs a piece of dunnage from the continuous length of dunnage, and a jaw that moves between a first and a second position. When in the first position, the jaw contacts the dunnage and exerts a first force on the dunnage that prevents substantial movement of the dunnage in an upstream direction while the dunnage is being severed. When in the second position, the jaw exerts a lower second force on the severed piece to retain the severed piece on the dunnage conversion machine. The second force can be low enough to prevent tearing of the severed piece when the severed piece is removed from the dunnage conversion machine.

27 Claims, 7 Drawing Sheets

(56) References Cited

U.S. PATENT DOCUMENTS

| | | | | |
|---|---|---|---|---|
| 5,607,383 | A | 3/1997 | Armington et al. | |
| 5,658,229 | A | 8/1997 | Armington et al. | |
| 5,674,172 | A | 10/1997 | Armington et al. | |
| 5,709,642 | A | 1/1998 | Ratzel et al. | |
| 5,749,539 | A | 5/1998 | Ratzel et al. | |
| 5,803,893 | A | 9/1998 | Armington et al. | |
| 5,891,009 | A | 4/1999 | Ratzel et al. | |
| 5,906,569 | A * | 5/1999 | Ratzel | B26D 1/245 493/464 |
| 5,908,375 | A | 6/1999 | Simmons et al. | |
| 5,938,580 | A * | 8/1999 | Siekmann | B31D 5/0047 493/464 |
| 5,997,461 | A | 12/1999 | Armington et al. | |
| 6,033,353 | A | 3/2000 | Lencoski et al. | |
| 6,080,097 | A | 6/2000 | Ratzel et al. | |
| 6,135,939 | A | 10/2000 | Lencoski et al. | |
| 6,168,560 | B1 | 1/2001 | Pluymaekers et al. | |
| 6,183,586 | B1 | 2/2001 | Heidelberger | |
| 6,277,459 | B1 | 8/2001 | Lencoski et al. | |
| 6,311,596 | B1 | 11/2001 | Ratzel et al. | |
| 6,398,703 | B1 | 6/2002 | Keller | |
| 6,402,674 | B1 | 6/2002 | Simmons, Jr. et al. | |
| 6,416,451 | B1 | 7/2002 | Ratzel et al. | |
| 6,468,197 | B1 | 10/2002 | Lencoski et al. | |
| 6,561,964 | B1 | 5/2003 | Armington et al. | |
| 7,041,043 | B2 | 5/2006 | Lucassen et al. | |
| 7,163,503 | B2 | 1/2007 | Toth | |
| 7,186,208 | B2 * | 3/2007 | Demers | B26F 3/02 493/967 |
| 7,503,247 | B2 | 3/2009 | Cavanagh | |
| 7,585,268 | B2 | 9/2009 | Cheich et al. | |
| 7,788,884 | B2 | 9/2010 | Cheich et al. | |
| 7,819,599 | B2 | 10/2010 | Kobayashi et al. | |
| 7,955,245 | B2 | 6/2011 | Cheich et al. | |
| 8,419,606 | B2 | 4/2013 | Carlson et al. | |
| 8,562,229 | B2 | 10/2013 | Inaba et al. | |
| 8,708,882 | B2 | 4/2014 | Chan et al. | |
| 9,994,343 | B2 | 6/2018 | Wetsch | |
| 10,814,578 | B2 | 10/2020 | Schalk et al. | |
| 10,926,506 | B2 | 2/2021 | Wetsch et al. | |
| 10,940,658 | B2 | 3/2021 | Lemmens | |
| 10,974,858 | B2 | 4/2021 | Wetsch et al. | |
| 11,034,121 | B2 * | 6/2021 | Wetsch | B31D 5/0043 |
| 11,207,860 | B2 | 12/2021 | Cheich | |
| 11,331,873 | B2 | 5/2022 | Peterlini | |
| 11,370,190 | B2 | 6/2022 | Schalk | |
| 11,491,756 | B2 | 11/2022 | Christman et al. | |
| 11,926,119 | B2 * | 3/2024 | Wetsch | B31D 5/0043 |
| 2003/0084769 | A1 | 5/2003 | Keller | |
| 2003/0139272 | A1 | 7/2003 | Simmons | |
| 2007/0199422 | A1 | 8/2007 | Kawaguchi | |
| 2008/0125301 | A1 | 5/2008 | Manley | |
| 2009/0082187 | A1 | 3/2009 | Cheich et al. | |
| 2009/0165625 | A1 | 7/2009 | Ishii et al. | |
| 2009/0258775 | A1 * | 10/2009 | Chan | B31D 5/0043 493/464 |
| 2010/0146795 | A1 | 6/2010 | Houle | |
| 2011/0053744 | A1 | 3/2011 | Wetsch et al. | |
| 2011/0061986 | A1 * | 3/2011 | Orsini | B31D 5/0043 192/133 |
| 2011/0281711 | A1 | 11/2011 | Chan et al. | |
| 2012/0027496 | A1 | 2/2012 | Mochida et al. | |
| 2012/0053040 | A1 | 3/2012 | Wetsch et al. | |
| 2013/0255457 | A1 | 10/2013 | Yazawa et al. | |
| 2013/0272769 | A1 | 10/2013 | Yazawa et al. | |
| 2014/0155241 | A1 | 6/2014 | Cheich et al. | |
| 2014/0274645 | A1 | 9/2014 | Wetsch et al. | |
| 2017/0066215 | A1 | 3/2017 | Cheich et al. | |
| 2017/0095991 | A1 * | 4/2017 | Wetsch | B65H 35/008 |
| 2017/0313016 | A1 * | 11/2017 | Schalk | B31D 5/0039 |
| 2018/0297804 | A1 | 10/2018 | Dominak et al. | |
| 2018/0326688 | A1 * | 11/2018 | Wetsch | H05F 3/02 |
| 2018/0326689 | A1 * | 11/2018 | Wetsch | B31D 5/0052 |
| 2019/0091959 | A1 | 3/2019 | Lemmens | |
| 2019/0176431 | A1 | 6/2019 | Carlson et al. | |
| 2020/0039170 | A1 | 2/2020 | Cheich et al. | |
| 2020/0139660 | A1 | 5/2020 | Corbin et al. | |
| 2020/0180255 | A1 | 6/2020 | Cheich et al. | |
| 2020/0180256 | A1 | 6/2020 | Cheich et al. | |
| 2021/0023808 | A1 | 1/2021 | Demers | |
| 2022/0048270 | A1 | 2/2022 | Orsini et al. | |
| 2022/0227091 | A1 | 7/2022 | Wetsch et al. | |
| 2024/0001639 | A1 | 1/2024 | Wetsch et al. | |

FOREIGN PATENT DOCUMENTS

| | | | |
|---|---|---|---|
| EP | 1762375 | A2 | 3/2007 |
| GB | 2508267 | A | 5/2014 |
| WO | 9731773 | A2 | 9/1997 |
| WO | 2007103466 | A2 | 9/2007 |

* cited by examiner

DUNNAGE DEVICE WITH TAG-TEARING PREVENTION

CROSS-REFERENCE TO RELATED APPLICATIONS

This application claims priority to U.S. Provisional Application No. 63/604,166, filed Nov. 29, 2023, and U.S. Provisional Application No. 63/665,181, filed Jun. 27, 2024, the disclosures of which are incorporated by reference herein in their entirety.

BACKGROUND

Paper-based protective packaging, or dunnage, is produced by crumpling or otherwise deforming paper stock. More specifically, paper dunnage is produced by running a generally continuous strip of paper through a dunnage conversion machine. The continuous strip of paper can be provided, for example, from a roll of paper or a fanfold stack of paper. The dunnage conversion machine converts the stock material into a lower density dunnage material using, for example, opposing rollers between which the stock material is passed. The rollers grip and pull the stock material from the roll or stack, and deform the stock material as the material passes between the rollers. The resulting dunnage can be cut into desired lengths to effectively fill a void space within a container holding a product. The cutting process may leave small tags or other remnants of paper extending from the edges of the severed piece of dunnage.

The individual pieces of dunnage material may be produced on an as-needed basis for a human operator or automated equipment performing packing operations, with the individual pieces typically being grasped or otherwise manipulated by the operator or the automated equipment immediately after being cut. The operator or the automated equipment typically commands the production of each piece of dunnage when needed during the packing operation.

In some applications, the dunnage conversion machine may be equipped with a hood or other form of retaining member that grasps or otherwise holds the severed piece of dunnage until the operator or the automated equipment retrieves the severed piece. In such applications, the retaining member and the adjacent surfaces of the dunnage conversion machine may tear or sever the small tags or other remnants of paper extending from the edges of the severed piece as a result of the cutting process. The tags or remnants can accumulate on the floor beneath the dunnage conversion machine, and within the dunnage conversion machine itself, creating a slipping hazard for the operator and other plant personnel, and raising the potential for jamming, excessive wear, and other types of issues within the dunnage conversion machine.

SUMMARY

In one aspect of the disclosed technology, a dunnage conversion machine includes a drive mechanism configured to deform a stock material into a continuous length of dunnage and to advance the continuous length of dunnage in a downstream direction; a cutting device configured to sever a piece of dunnage from the continuous length of dunnage; and a jaw configured to move between a first and a second position. The jaw is configured to have a first position at which the jaw contacts the continuous length of dunnage and exerts a first force on the continuous length of dunnage. The jaw is configured to have a second position at which the jaw exerts a second force on the severed piece of dunnage to retain the severed piece on the dunnage conversion machine, the second force being less than the first force.

In another aspect of the disclosed technology, the first force prevents substantial movement of the continuous length of dunnage in an upstream direction while the continuous length of dunnage is being severed by the cutting device.

In another aspect of the disclosed technology, the second force is low enough to prevent tearing of the severed piece of dunnage when the severed piece of dunnage is removed from the dunnage conversion machine with the jaw in the second position.

In another aspect of the disclosed technology, the jaw is a first jaw; and the dunnage conversion machine further includes a second jaw configured to support the severed piece of dunnage while the first jaw exerts the second force on the dunnage so that the first jaw and the second jaw pinch the severed piece to retain the severed piece on the dunnage conversion machine.

In another aspect of the disclosed technology, the second jaw has a curved surface configured to contact the severed piece of dunnage.

In another aspect of the disclosed technology, at least a portion of the second jaw is C-shaped.

In another aspect of the disclosed technology, the jaw and the second jaw each have a width transverse to the upstream and downstream directions; and the width of the second jaw is less than the width of the jaw.

In another aspect of the disclosed technology, the jaw is configured to move between the first position, the second position, and a third position; and the jaw is configured so that the jaw, when in the third position, is substantially out of the path of the continuous length of dunnage to allow of the continuous length of dunnage to advance in the downstream direction past the jaw.

In another aspect of the disclosed technology, a motor is coupled to the jaw and is configured to apply a motor force to the jaw to move the jaw between the first and third positions.

In another aspect of the disclosed technology, the jaw is configured to rotate between the first, second, and third positions; and the motor is configured so that the motor force produces a torque that rotates the jaw between the first and third positions.

In another aspect of the disclosed technology, a controller is communicatively coupled to the motor and configured to generate an output that, when received by the motor, causes the motor to apply the motor force to the jaw.

In another aspect of the disclosed technology, the controller is configured so that the motor does not apply the motor force to the jaw when the jaw is in the second position.

In another aspect of the disclosed technology, the second force is generated solely by a weight of the jaw.

In another aspect of the disclosed technology, the dunnage conversion machine includes a sensor communicatively coupled to the controller and configured to detect a presence of the severed piece of dunnage within a sensing field of the sensor; and the sensor is configured to generate an output when the severed piece of dunnage is removed from the sensing field of the sensor, wherein the output, when received by the controller, causes the controller to command the motor to apply the motor force to move the jaw to the third position.

In another aspect of the disclosed technology, the controller is configured to cause the dunnage conversion machine to: in response to a user input, dispense the continuous length of dunnage with the jaw in the third position until the user ceases the input; upon cessation of the user input, apply the motor force move the jaw to the first position, and cause the drive mechanism to reverse to sever the continuous length of dunnage; and reduce the motor force or set the motor force to zero after the continuous length of dunnage has been severed so that the jaw moves from the first to the second position and thereby retains the severed piece of dunnage on the dunnage conversion machine.

In another aspect of the disclosed technology, the controller is configured to apply the motor force to move the jaw to the third position after the continuous length of dunnage has been severed to release the severed piece of dunnage from the dunnage conversion machine.

In another aspect of the disclosed technology, the controller is configured to cause the dunnage conversion machine to: in response to a user input, dispense the continuous length of dunnage to a specified length input previously to the controller with the jaw in the third position; after the continuous length of dunnage has been dispensed to the specified length, apply to motor force to move the jaw to the first position, and reverse the drive mechanism to sever the continuous length of dunnage; and reduce the motor force or set the motor force to zero after the continuous length of dunnage has been severed so that the jaw moves from the first to the second position and thereby retains the severed piece of dunnage on the dunnage conversion machine.

In another aspect of the disclosed technology, the controller is configured to cause the dunnage conversion machine to: in response to continuation of the user input, dispense a second continuous length of dunnage to the specified length input previously to the controller with the jaw in the third position; after the second continuous length of dunnage has been dispensed to the specified length, apply the motor force to move the jaw to the first position and reverse the drive mechanism to sever the second continuous length of dunnage; and apply the motor force to move the jaw to the third position after the second continuous length of dunnage has been severed to release the severed piece of dunnage from the second continuous length of dunnage from the dunnage conversion machine.

In another aspect of the disclosed technology, the controller is configured to cause the dunnage conversion machine to: in response to a user input, dispense the continuous length of dunnage to a specified length input previously to the controller with the jaw in the third position; upon cessation of the user input, apply the motor force move the jaw to the first position, and cause the drive mechanism to reverse to sever the continuous length of dunnage; reduce the motor force or set the motor force to zero after the continuous length of dunnage has been severed so that the jaw moves from the first to the second position and thereby retains the severed piece of dunnage on the dunnage conversion machine; and in response to receiving the input from the sensor indicating that the severed piece of dunnage has been removed from the sensing field of the sensor, apply the motor force to move the jaw to the third position, and dispense another continuous length of dunnage to the specified length input previously to the controller.

In another aspect of the disclosed technology, the jaw includes a hood.

In another aspect of the disclosed technology, the hood includes a top portion, and a first and a second side portion extending from the top portion and having a generally perpendicular orientation in relation to the top portion.

In another aspect of the disclosed technology, the jaw is configured so that the second position of the jaw is adjustable.

In another aspect of the disclosed technology, a system, includes a dunnage conversion machine and a supply of the stock material.

In another aspect of the disclosed technology, a method of converting dunnage, includes deforming the stock material into a continuous length of dunnage and advancing the continuous length of dunnage in a downstream direction using a drive mechanism of a dunnage conversion machine, while a jaw is in a third position of the jaw at which the jaw permits the continuous length of dunnage to advance in the downstream direction past the jaw; moving the jaw to a first position at which the jaw contacts the continuous length of dunnage and exerts a first force on the continuous length of dunnage that prevents substantial movement of the continuous length of dunnage in an upstream direction while the continuous length of dunnage is being severed by a cutting device; and subsequently releasing or reducing a force on the jaw so that the jaw moves to a second position of the jaw at which the jaw exerts a second force on the severed piece of dunnage to retain the severed piece on the dunnage conversion machine, the second force being less than the first force.

In another aspect of the disclosed technology, the method of converting dunnage further includes removing the severed piece of dunnage from the dunnage conversion machine while the jaw is in the second position.

In another aspect of the disclosed technology, the method of converting dunnage further includes subsequently releasing or reducing a force on the jaw comprises setting a motor force exerted by a motor to approximately zero, the motor force generated by a motor configured to move the jaw between the first and third positions.

BRIEF DESCRIPTION OF DRAWINGS

The following drawings are illustrative of particular embodiments of the present disclosure and therefore do not limit the scope of the present disclosure. Embodiments of the present disclosure will hereinafter be described in conjunction with the appended drawings, wherein like numerals denote like elements.

DETAILED DESCRIPTION

Figure 1:
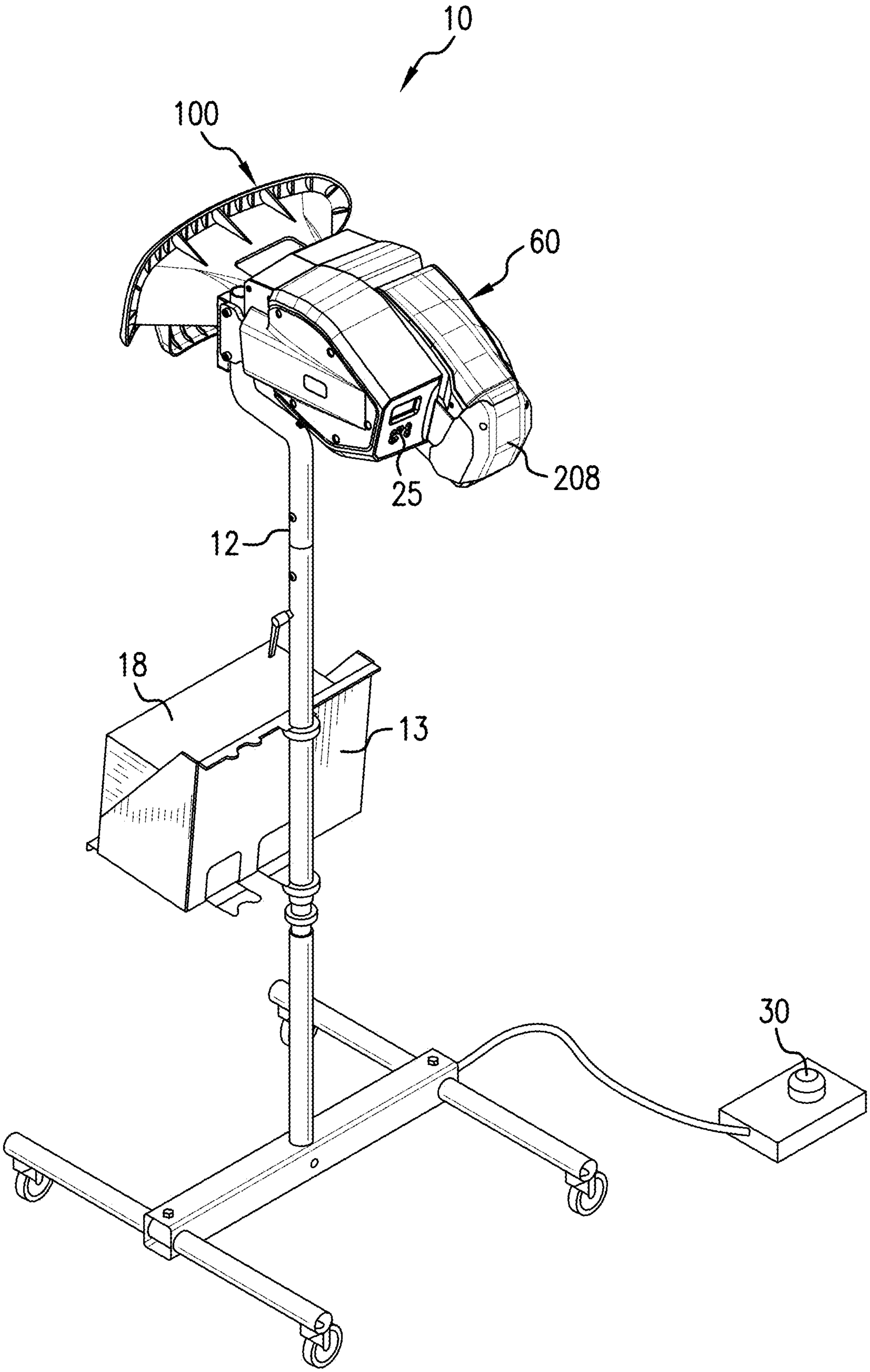
FIG. 1 is a top perspective view of a system for producing dunnage.

The inventive concepts are described with reference to the attached figures, wherein like reference numerals represent like parts and assemblies throughout the several views. Several aspects of the inventive concepts are described below with reference to example applications for illustration. It should be understood that numerous specific details, relationships, and methods are set forth to provide a full understanding of the inventive concepts. One having ordinary skill in the relevant art, however, will readily recognize that the inventive concepts can be practiced without one or more of the specific details or with other methods. In other instances, well-known structures or operation are not shown in detail to avoid obscuring the inventive concepts.

Figure 3:
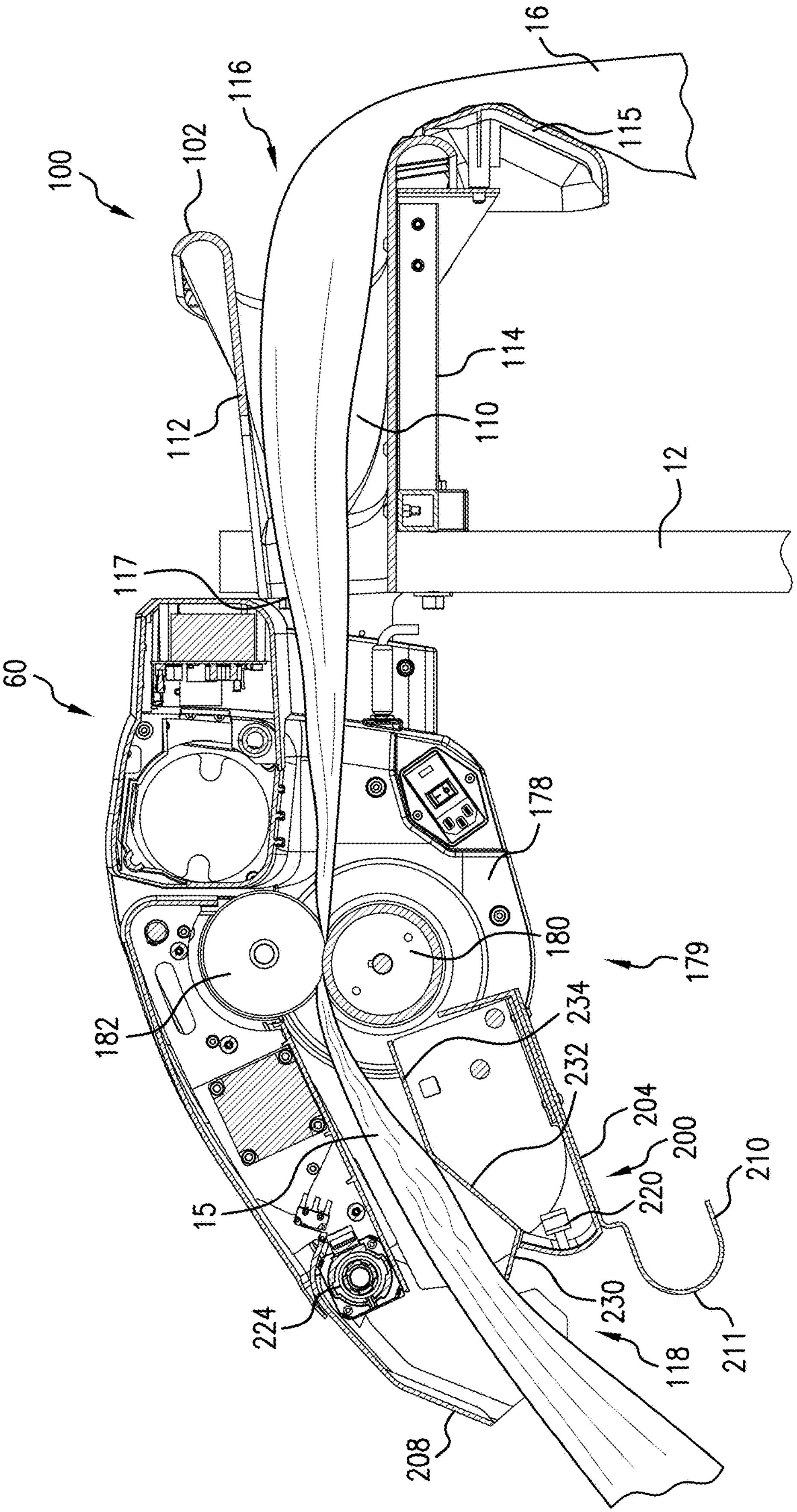
FIG. 3 is a cross-sectional view of the system shown in FIGS. 1 and 2, depicting stock material being converted to dunnage and showing a hood of a dunnage conversion machine of the system in a third position of the hood.
Figure 4:
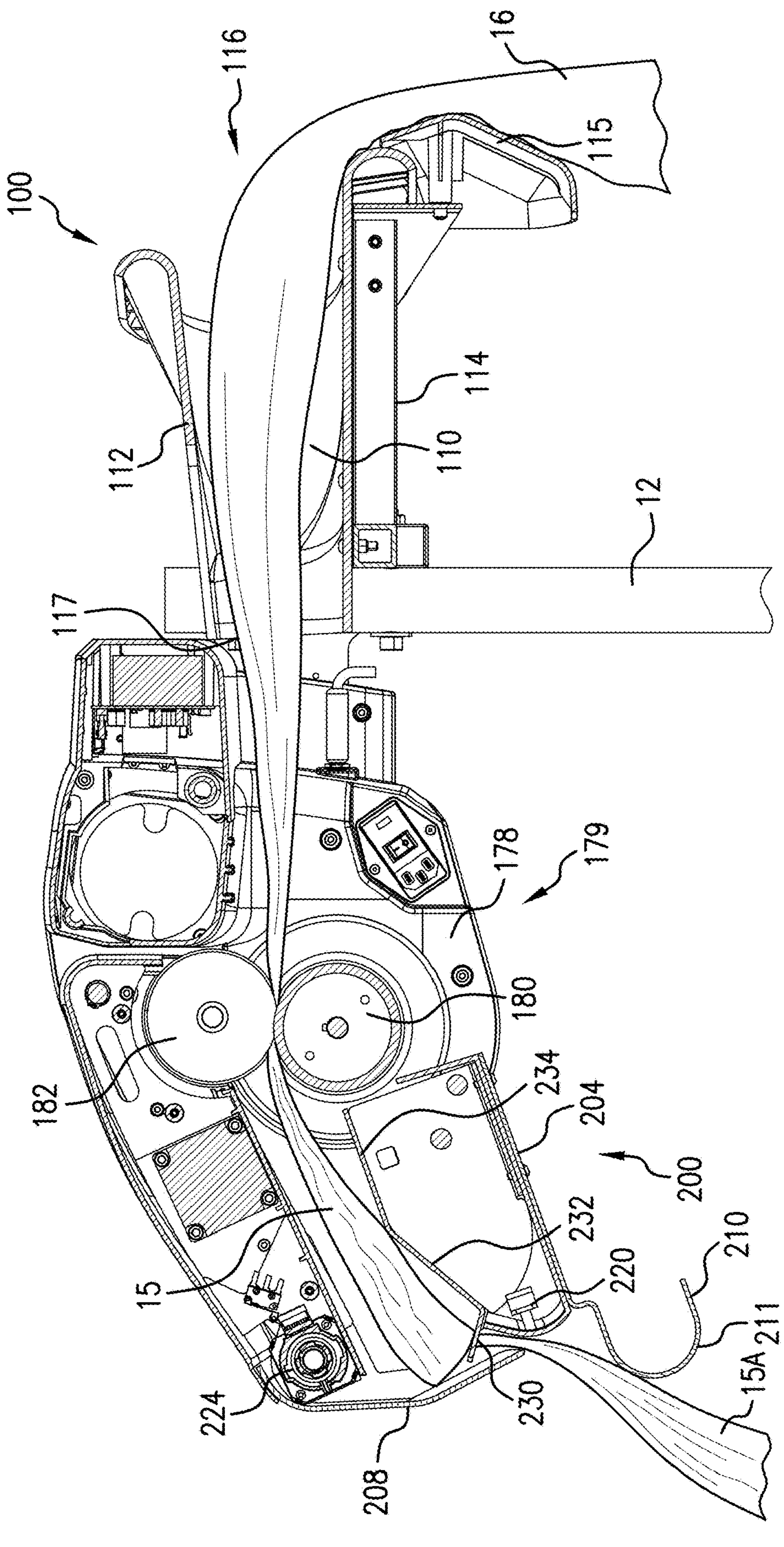
FIG. 4 is a cross-sectional view of the system shown in FIGS. 1-3, depicting the stock material being converted to dunnage and showing the hood in a first position of the hood.
Figure 5:
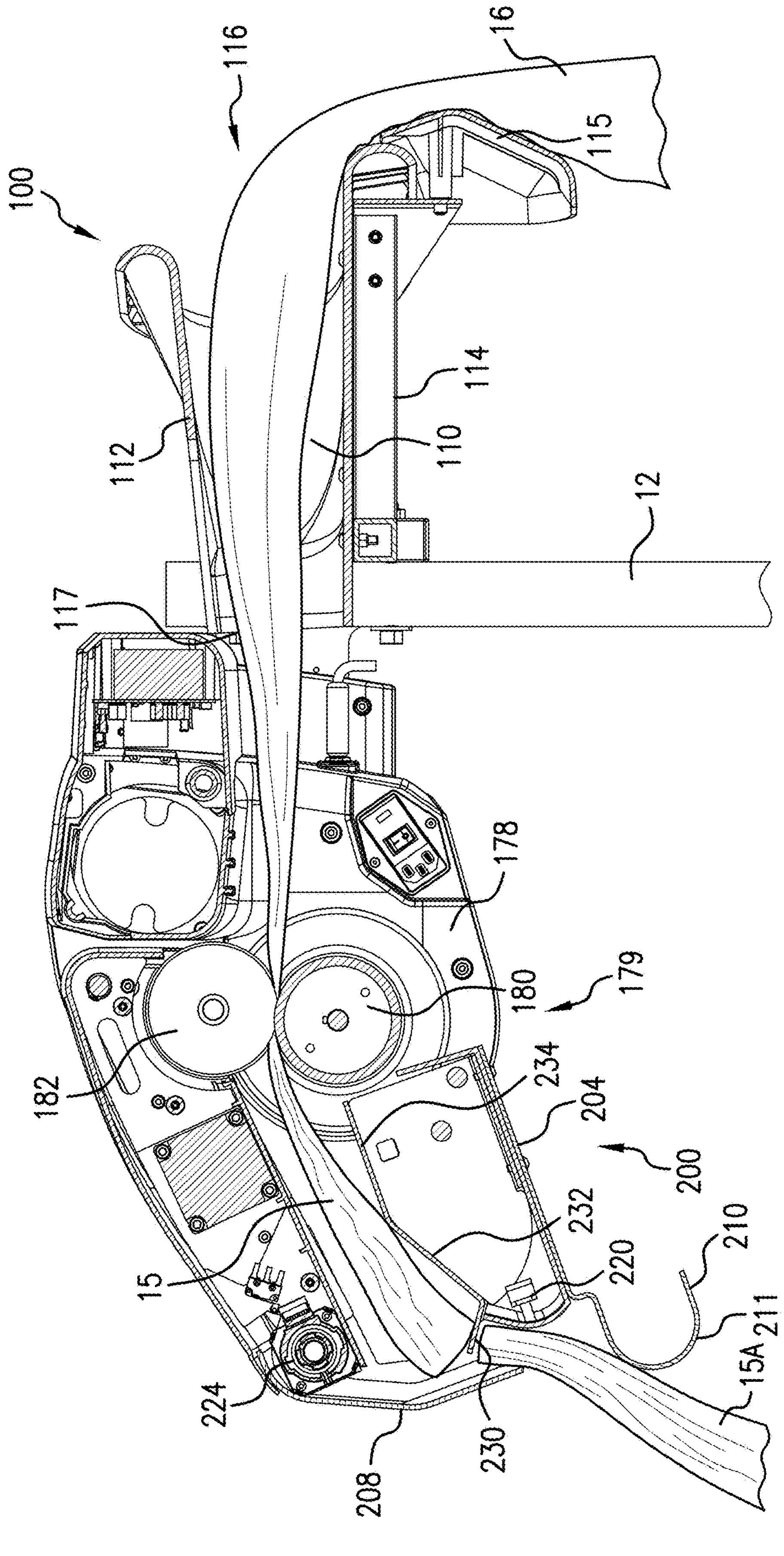
FIG. 5 is a cross-sectional view of the system shown in FIGS. 1-4, depicting the stock material being converted to dunnage and showing the hood in a second position of the hood.

Directional terms such as "top," "bottom," "upper," "lower," etc. are used in relation to the component orientations depicted in FIGS. 3-5. These terms are used for illustrative purposes only, and are not intended to limit the scope of the appended claims.

The figures depict a system 10 for producing dunnage 15. The system 10 is configured to process stock material 16 into dunnage 15. The system 10 includes a dunnage apparatus 50, and a supply unit 18 of stock material 16.

Protective packaging articles are configured for placement within a packaging container or between packaging containers or items being shipped or stored, to protect items, fill void space within a container, such as a packaging container, and/or prevent or inhibit the items from moving around within the container. While there is overlap between the following categories, example categories of protective packaging articles include protective-fill articles, and block-and-brace articles.

Protective-fill articles are typically provided individually or as a plurality of units that are configured for placing into the void space to provide a desired level of packaging. Such units typically are of a predetermined size or can have a predetermined dimensions and be selectively configurable in another dimension, such as length. In some examples, the size of the protective-fill articles can be configurable in a plurality or all of their dimensions. Protective-fill articles are typically resiliently compressible to around corners, edges, and sides of a packaged item to fill the space around the item, instead of assuming a solid shape that corresponds to the space around the item. Protective-fill articles include, for example, void-fill articles and cushioning articles.

Void-fill articles typically provide minimal cushioning properties and are relatively soft. They are typically used to fill empty void space in packaging containers to reduce the movement within the container of lightweight items that are not delicate, such as a thin book. An example of void-fill includes crumpled-paper dunnage with a fairly weak loft pattern and other space fillers that are easily compressible.

Cushioning articles are configured to provide cushioning to the packaged items and protection to various degrees against shocks and impact. Examples of cushioning materials include inflatable air pillows and cushions, bubble wrap, paper dunnage with a loft structure capable of withstanding moderate shocks and impact, foam sheets, and packing peanuts. Typically, both void-fill and cushioning articles are provided as a plurality of units of one or more similar sizes, typically common predetermined sizes, although in some applications the void-fill or cushioning articles can be made to custom sizes. Some cushioning articles are also packaging containers, such as padded mailers or other containers with a padded wall.

The plurality of void-fill or cushioning articles that are used is typically selected to sufficiently fill the void space within the container to serve the desired protective function. Some void-fill or cushioning articles can be used to enclose or otherwise surround an item, such as expandable-paper or bubble wrap that can be used to wrap an item, such as a bottle.

Block-and-brace articles are configured to restrain packaged items from substantial movement in relation to the packaging container and often provide the highest level of protective cushioning and impact resistance and are typically configured in association with the container, typically a box, to stabilize the item within the container and minimize or prevent its movement. Block-and-brace articles tend to be used with heavy and/or delicate bulky items to protect them against breakage during shipping. Some block-and-brace articles are formed around an item being packaged within void space in a container, others are pre-formed to receive or fit against the packaged item and to fit precisely within the container to prevent movement of the item, and others are bent or shaped prior to insertion of the item into the container. Examples of block-and-brace articles are foam-in-place or foam-in-bag articles, which are typically formed by mixing foam precursors and injecting the mixture into flexible bags, such as made of poly film; the filled bags are placed in the box or other container with the item, and the precursor mixture foams to several hundred times its original size, filling the void between the item and the container, and then solidifying into a custom shape. Other examples include molded foam blocks, such as polystyrene, or cardboard forms that conform to the shape of the packaged item and the container. Block and brace also can include paper block and brace articles that with an elevated stiffness; these are often formed by multiple plies of paper and are produced to lock in fold or other shape in the paper that provides loft.

Block-and-brace typically receives and traps corner, edge, or other surface of the item within the box. Block and brace is typically used to protect heavy and delicate item during shipping, such as a large television set or an automobile clutch.

Protective articles that include an amount of padding, such as void-fill, cushioning, and block-and-brace, can be provided in their operable configuration, or can be provided in a high-density configuration and then expanded, such as a customer site, to a low-density configuration that provides the requisite amount of padding or thermal insulation. Examples of expandable materials and construction for the expandable articles include inflatable films and webs, paper that is crumpled or manipulated by a device to crease the paper to maintain loft, and chemical foams.

The dunnage apparatus 50 includes a dunnage conversion machine 60; an intake 100 mounted on the dunnage conversion machine 60 and configured to direct the stock material 16 to the dunnage conversion machine 60; a support 12 configured to support the dunnage conversion machine 60; and a supply station 13 configured to hold the supply unit 18 of stock material 16. The support 12 and the supply station 13 can have configurations other than those depicted in FIG. 1, in alternative embodiments.

The dunnage conversion machine 60 processes the stock material 16 into the dunnage 15 by forming longitudinal or transverse creases in the stock material 16, or otherwise deforming the material. The stock material 16 can be stored in a roll (whether drawn from inside or outside the roll), a wind, a fan-folded source, or other suitable form. The stock material 16 can be continuous or perforated. The dunnage conversion machine 60 is fed the stock material 16 from the supply unit 18 in a first, or downstream direction, which can be an anti-run out direction.

The supply station 13 has a basket-type configuration. This particular configuration 13 is disclosed for illustrative purposes only. In alternative embodiments, the supply station 13 can have other configurations suitable for supporting the supply unit(s) 18 in single bundles; in multiple daisy chained bundles; in a flat configuration; in a rolled configuration; and/or in a curved configuration.

The stock material 16 can be any suitable type of protective packaging material including, for example, flat or rolled paper stock or fiber-based materials in sheet form. Other embodiments can use supplies of wound fiber material such as ropes or thread. Other embodiments can use thermoplastic materials such as a web of plastic material usable to form pillow packaging material. The stock material 16 can be configured in a fan-folded supply unit having, for example, 30-inch transverse width or a 15-inch transverse width. The sheets can be fan folded in single layers. In other embodiments, the multiple layers of sheets can be fan folded together such that dunnage is made of superimposed sheets that are crumpled together in the conversion process.

The stock material 16 may be, for example, regular kraft paper stock stored in a high-density configuration, and subsequently converted into the low-density dunnage 15 by the dunnage conversion machine 60. The stock material 16 can have a basis weight of, for example, about 20 lbs. to about 100 lbs. The stock material 16 can be configured as a ribbon of sheet material that is stored in a fan-fold structure; or in coreless rolls. The stock material 16 can be formed or stored as single-ply or multiple plies of material. Where multi-ply material is used, a layer can include multiple plies. Other types of materials of suitable thickness, weight, and dimensions can be used as the stock material 16, such as pulp-based virgin and recycled papers, extensible paper, newsprint, cellulose and starch compositions, and poly or synthetic material.

As discussed above, the supply units 18 of stock material 16 may have a fan-fold configuration as shown in FIG. 1. For example, a foldable material, such as paper, may be folded repeatedly to form a stack or a three-dimensional body. The term "three-dimensional body," in contrast to the "two-dimensional" material, has three dimensions all of which are non-negligible. A continuous sheet, e.g., a sheet of paper, plastic, or foil, can be folded at multiple fold lines that extend transversely to a longitudinal direction of the continuous sheet, or transversely to the feed direction of the sheet. For example, folding a continuous sheet that has a substantially uniform width along transverse fold lines can form or define sheet sections that have approximately the same width. The continuous sheet can be folded sequentially, in opposite or alternating directions, to produce an accordion-shaped continuous sheet. For example, the folds may form or define sections along the continuous sheet, and the sections may be substantially rectangular.

For example, sequentially folding the continuous sheet may produce an accordion-shaped continuous sheet with sheet sections that have approximately the same size and/or shape as one another. Multiple adjacent sections that are defined by the fold lines can be generally rectangular, and can have the same first dimension, e.g., a dimension corresponding to the width of the continuous sheet, and the same second dimension that is generally along the longitudinal direction of the continuous sheet. For example, when the adjacent sections are contacting one another, the continuous sheet may be configured as a three-dimensional body or a stack, in an accordion shape that is formed by the folds and be compressed, so that the continuous sheet forms a three-dimensional body or stack.

The fold lines of the stock material 16 can have any suitable orientation relative to one another, as well as relative to the longitudinal and transverse directions of the continuous sheet. Also, the stock material supply unit 18 can have transverse folds that are parallel one to another. For example, the sections that are formed by the fold lines can be compressed to form a three-dimensional body that is a rectangular prismoid. Also, the stock material 16 can have one or more folds that are non-parallel relative to the transverse folds.

The stock material 16 can be provided as any suitable number of the discrete material supply units 18. In some embodiments, two or more stock material units can be connected together to provide a continuous feed of material into the dunnage conversion machine 60. The stock material 16 can be fed from the connected stock material units sequentially or concurrently, i.e., in series or in parallel. The stock material units can have various suitable sizes and configurations and may include one or more stacks or rolls of suitable sheet materials. The term "sheet material" refers to a material that is generally sheet-like and two-dimensional, i.e., two dimensions of the material are substantially greater than the third dimension so that the third dimension is negligible or de minimis in comparison to the other two dimensions. Also, the sheet material can be generally flexible and foldable, such as the illustrative materials described herein.

The stock material units can include an attachment mechanism that connects multiple stock material units, for example, to produce a continuous material feed from multiple discrete stock material units. The respective end and beginning of consecutive rolls can be joined by adhesive or other suitable means, to facilitate daisy-chaining the rolls together to form a continuous stream of sheet material that can be fed into the dunnage conversion machine 60.

Folding a continuous sheet along the transverse fold lines can form or define generally rectangular sheet sections of a fan-folded stock material unit. The rectangular sheet sections can stack together by, for example, folding the continuous sheet in alternating directions, to form the three-dimensional body that has longitudinal, transverse, and vertical dimensions. The stock material 16 from the stock material units can be fed through an intake 100 of the system 10. In some applications, the transverse direction of the continuous sheet of stock material can be greater than one or more dimensions of the intake 100. For example, the transverse dimension of the continuous sheet can be greater than the diameter of a generally round intake. Reducing the width of the continuous sheet in this manner at the start of the conversion process can facilitate passage thereof into the intake 100. The decreased width of the leading portion of the continuous sheet may facilitate smoother entry and/or transition of a daisy-chained continuous sheet and/or may reduce or eliminate catching or tearing of the continuous sheet. Moreover, reducing the width of the continuous sheet at the start thereof can facilitate connecting together or daisy-chaining two or more stock material units. For example, connecting or daisy-chaining material with a tapered section may be accomplished using smaller connectors or splice elements than would be required otherwise.

Also, tapered sections may be easier to manually align and/or connect together in comparison to full-width sheet sections.

The stock material 16 being converted to the dunnage 15 follows a material path in a downstream direction through the system 10. The material path has an inlet 116 where the stock material 16 is fed into the system 10, and an outlet 118 where the dunnage 15 exits the system 10.

The intake 100 comprises an inlet chute 102. The inlet chute 102 includes two side panels 110, a top panel 112, and a bottom panel 114, as shown in FIGS. 3-5. Each side panel 110 adjoins a respective side of the top panel 112 and a respective side of the bottom panel 114. The intake 100 defines the inlet 116, and an outlet 117 of the intake. The inlet chute 102 is attached to a forward, or upstream end of the dunnage conversion machine 60, so that the outlet 117 of the intake 100 aligns with an inlet of the dunnage conversion machine 60. The inlet chute 102 can be attached to the dunnage conversion machine 60 by a suitable technique such as fasteners.

The inlet chute 102 defines a portion of the material path for the stock material 16. In particular, the side panels 110, top panel 112, and bottom panel 114 define a passage that extends between the inlet 116 and the outlet 117 of the inlet chute 102. The stock material 16 enters the passage by way of the inlet 116. The stock material 16 is drawn through the passage until it reaches the outlet 117, at which point the stock material 16 exits the intake 100 and enters the dunnage conversion machine 60.

The side panels 110 of the inlet chute 102 angle inwardly along the length of the intake 100, so that the width of the passage decreases between the inlet 116 and the outlet 117. For example, the width of the upstream end of the passage can be about equal to the initial width of the stock material 16. As the stock material 16 is drawn through the passage, the angled orientation of the side panels 110, causes the side panels 110 to push the opposing sides of the stock material 16 toward each other, which in turn causes the stock material 16 to crumple and undergo a decrease in its overall width prior to exiting the intake 100 via the outlet 117.

Details of the intake 100 are provided for illustrative purposes only. The intake 100 can have other configurations in alternative embodiments of the system 10.

Figure 7:
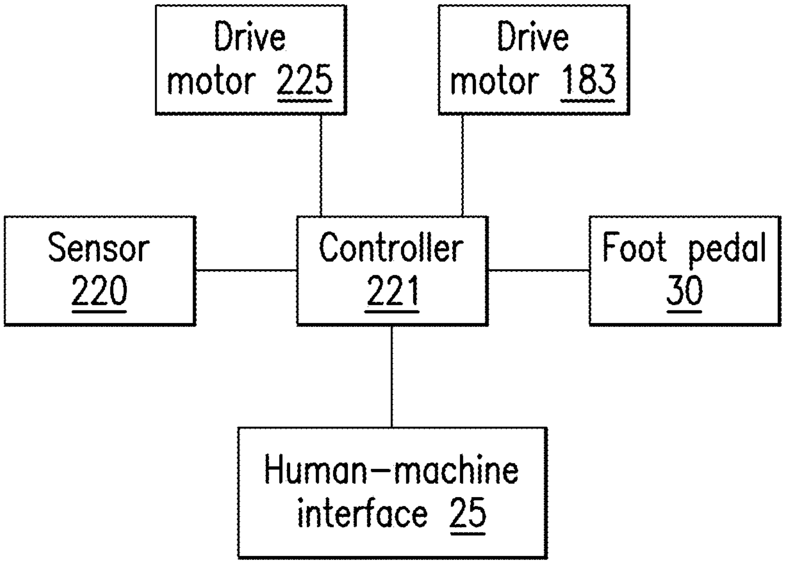
FIG. 7 is a diagrammatic illustration of various electrical and electronic components of the system shown in FIGS. 1-6.

The dunnage conversion machine 60 includes an enclosure 61; an outlet chute 119; a cutting mechanism 200; and a feed motor (not shown). The dunnage conversion machine 60 also includes a frame 178, and a drive mechanism 179 comprising a first roller 180, a second roller 182, and a reversible drive motor 183 that drives the first roller 180 in rotation. The drive motor 183 is communicatively coupled to a controller 221. The controller 221 and the drive motor 183 are depicted in FIG. 7.

The controller 221 comprises a processor, such as a microprocessor; an internal bus; a memory communicatively coupled to the processor via the bus; computer-executable instructions stored in the memory; and an input-output interface communicatively coupled to the internal bus. The computer-executable instructions, upon being executed by the processor, cause the controller to perform the logical operations disclosed herein. The controller can include components in addition to, or in lieu of those disclosed herein, a description of which is not necessary to an understanding of the disclosed technology.

The drive mechanism 179 is configured to deform the stock material 16 into the continuous length of dunnage 15, and to advance the continuous length of dunnage 15 in a downstream direction. The stock material 16 passes between the first roller 180 and the second roller 182, and is moved along a material path within the dunnage machine 60 by the first roller and second rollers 180, 182. The second roller 182 is idle, i.e., is not driven directly by a motor. The second roller 182 is spring biased toward the first roller 180, so that the stock material 16 is pinched between the first roller 180 and the second roller 182, and the resulting friction between the rotating first roller 180 and the stock material 16 moves the stock material 16 along the material path. Also, the pressure exerted by the first roller 180 and the second roller 182 on the stock material 16 forms creases in the stock material 16 along the folds formed previously in the intake 100, thereby converting the high-density stock material 16 into the lower-density dunnage 15. In alternative embodiments, both the first roller 180 and the second roller 182 can be driven. In other alternative embodiments, the drive mechanism 179 can have a configuration other that motor-drive rollers. For example, alternative embodiments of the dunnage conversion machine 60 can be equipped a paper crumpler or other types of devices for deforming the stock material 16 into the continuous length of dunnage 15.

The cutting mechanism 200 includes a cutting device in the form of a blade 202, a housing 204, and a sensor 220. The blade 202 includes a cutting portion 230, an intermediate portion 232 that adjoins the cutting portion 230, and an upstream portion 234 that adjoins the intermediate portion 232. The cutting portion 230 includes a plurality of teeth configured to sever the dunnage 15 as discussed below. The intermediate portion 232 and the upstream portion 234 define a portion of the material path of the dunnage 15, and help to guide the dunnage 15 toward the outlet 118.

The sensor 220 is communicatively coupled to the controller 221. The sensor 220 may be an optical sensor or another suitable type of sensor. The sensor 220 is positioned adjacent to or otherwise near the outlet 118, so that the sensor 220 can detect the presence of the dunnage 15 exiting the dunnage conversion machine 60. The sensor 220 is configured to generate an output indicative of presence and/or absence of the dunnage 15 at or near the outlet 118.

The dunnage conversion machine 60 further includes a first jaw. The first jaw can be, fore example, a hood 208. The hood 208 is coupled to and can rotate in relation to the frame 178. The hood 208 is rotated by a hood drive mechanism 224. The hood drive mechanism 224 includes a drive motor 225 communicatively coupled to the controller 221, sprockets driven directly by the drive motor 225, and a linkage that transmits torque applied to the sprockets by the drive motor 225 such that the sprockets rotate the hood 208. The drive motor 225 is depicted diagrammatically in FIG. 7. This particular configuration for the hood drive mechanism 224 is described for illustrative purposes only. Alternative embodiments can include drive mechanisms having other configurations. Additional details of the hood drive mechanism 224 are contained in U.S. application Ser. No. 18/346,123, titled DUNNAGE SYSTEMS WITH AUTOMATED FEEDING CAPABILITY, the contents of which are incorporated by reference herein in their entirety.

The dunnage conversion machine 60 additionally may include a second jaw configured to support the dunnage 15 exiting the dunnage conversion machine 60. The second jaw can be, for example, a support 210. The support 210 is mounted at, or proximate the outlet 118. The support 210 can include a curved portion 211. The curved portion 211 can be C-shaped, with the inner or concave side of the curved portion 211 facing downward and away from the dunnage 15 being discharged from the dunnage 15. The support 210 can be formed a rigid or semi-rigid material.

The hood 208 and the support 210 each have a width that is transverse to the direction of travel of the dunnage along the material path. The width of the curved portion 211 of the support 210 can be less than the width of the hood 208. In some embodiments, the width of the curved portion 211 of the support 210 can be less than 50 percent of the width of the hood 208. In other embodiments, the width of the curved portion 211 of the support 210 can be less than 25 percent of the width of the hood 208. In other embodiments, the width of the curved portion 211 of the support 210 can be less than ten percent of the width of the hood 208.

As noted above, the hood 208 is rotated in relation to the frame 178 by the hood drive mechanism 224. The hood drive mechanism 224, in response to inputs from the controller 221, causes the hood 208 to rotate between various preprogrammed positions. The positions may include any positions between, and including the positions shown in FIGS. 3 and 4. In the disclosed embodiment, the hood 208 moves between a first position shown in FIG. 4; a second position shown in FIGS. 5 and 6; and a third position shown in FIGS. 2 and 3. Each position may be adjusted depending on the requirements of a particular application, such as the thickness of stock material 16. In alternative embodiments, the hood 208 can be configured to move between more, or less than three positions.

Figure 2:
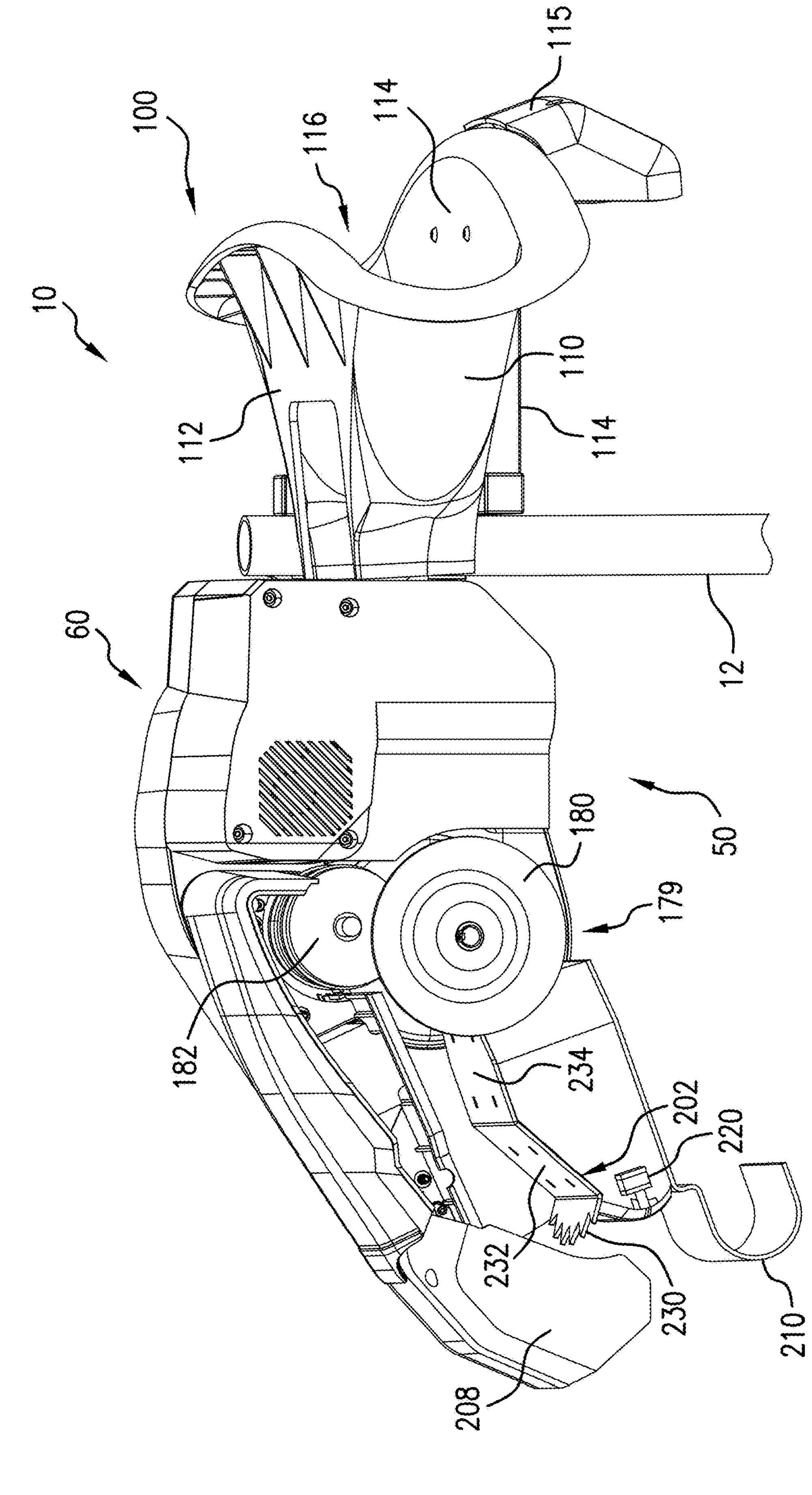
FIG. 2 is a perspective view of the system shown in FIG. 1, with a side cover of a dunnage conversion machine of the system removed.

FIGS. 2 and 3 depict the hood 208 in the third position of the hood 208. When in the third position, the hood 208 is located out of, or substantially out of the material path of the dunnage 15 so that the dunnage 15 can be advanced freely past the hood 208 it exits the dunnage conversion machine via the outlet 118. When the hood 208 is in the third position, the drive motor 225 of the hood drive mechanism 224 is exerting a clockwise torque on the hood 208 (from the perspective of FIG. 3) via the sprockets and the linkage of the drive mechanism, with the torque restraining the hood 208 in the third position. As discussed below, the hood 208 may be moved automatically to the third position immediately after a piece 15A of the dunnage 15 has been severed by the cutting mechanism 200, or immediately after the severed piece 15A has been retrieved by the operator or automated equipment. The distance along which the hood 208 travels when moving between the second and third positions is denoted in FIG. 6 by the arrow 236.

FIG. 4 depicts the hood 208 in the first position of the hood 208. When the hood 208 is in the first position, the drive motor 225 of the hood drive mechanism 224 is exerting a counterclockwise torque on the hood 208 (from the perspective of FIG. 4). Thus, the portion of dunnage 15 located between the hood 208 and the support 210 is trapped between the hood 208 and the support 210 and is subjected to a downward first force exerted on the dunnage 15 by the hood 208. As discussed below, the dunnage conversion machine 60 is configured to cut the dunnage 15, and to hold the severed piece of dunnage 15A between the hood 208 and the support 210 when the hood 208 is in its first position. In alternative embodiments, the first force may be generated by other mechanisms such as a weight or a magnet.

Figure 6:
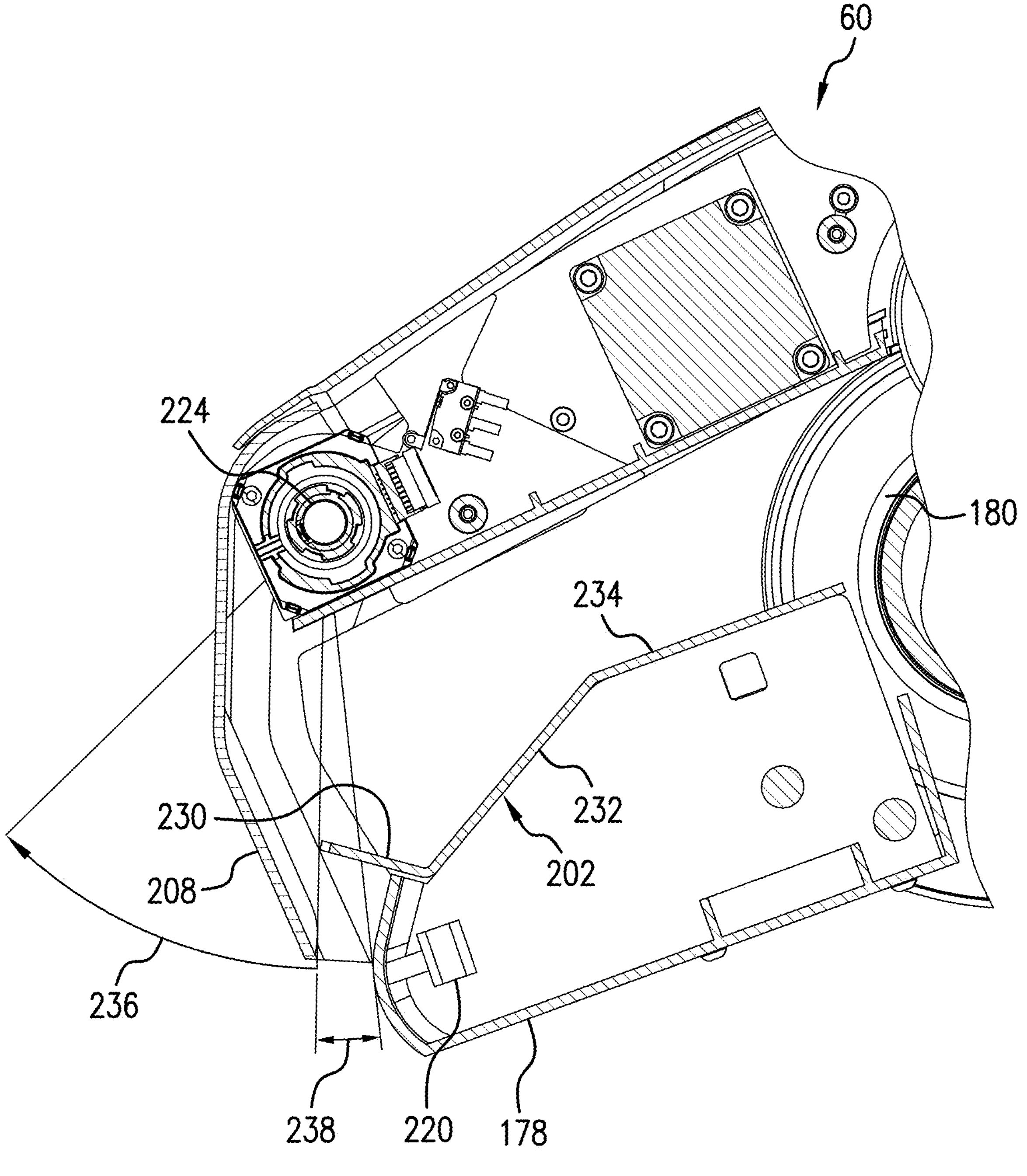
FIG. 6 is a magnified cross-sectional view of the system shown in FIGS. 1-5, showing the hood in the second position of the hood.

FIGS. 5 and 6 depict the hood 208 in the second position of the hood 208. The drive motor 225 of the hood drive mechanism 224 does not exert any torque on the hood 208 when the hood 208 is in the second position, so the hood 208 is able to rotate freely. As can be seen by a comparison of FIGS. 4 and 5, the hood 208 has rotated slightly in the clockwise direction in moving from the first to the second position due the cessation of the motor torque on the hood 208, and the resilience of the underlying piece of dunnage 15A. The distance by which the end of the hood 208 moves as the hood 208 rotates between its first and second positions is denoted in FIG. 6 by the arrow 238. In some embodiments, this distance can be less than about 2 inches. In other embodiments, the distance can be less than about 1 inch. In other embodiments, the distance can be less than about ½ inch. In other embodiments, the distance can be less than about ¼ inch.

Thus, when the piece of dunnage 15A is positioned between the hood 208 and the support 210 after being cut, the hood 208 rests on top of the piece of dunnage 15A, and the piece of dunnage 15A is subjected to the downward second force exerted by the hood 208. The second force is generated solely by the weight of the hood 208, and therefore is less than the first force. The second force is sufficient to cause the piece of dunnage 15A to be retained between the hood 208 and the support 210, but is low enough to allow the piece of damage 15A to be pulled from between the hood 208 and the support 210 by the operator or automated equipment when the piece of dunnage 15A is to be retrieved. In alternative embodiments, the controller 221 can cause the drive motor 225 to move the hood 208 from the first to the second position, and to exert a relatively low torque on the hood 208 to maintain the hood 208 in the second position of the hood 208 while allowing the piece of damage 15A to be pulled from between the hood 208 and the support 210.

The dunnage conversion machine 60 is configured to cut the dunnage 15 when the hood 208 is in the first position of the hood 208. In particular, the dunnage 15 is advanced past the cutting portion 230 of the blade 202 of the cutting mechanism 200, by the drive mechanism 179, while the hood 208 is in the third position of the hood. Once a length of dunnage 15 corresponding the length of the dunnage 15 to be cut has passed the cutting portion 230, the controller 221 deactivates the drive motor 183 of the drive mechanism 179, and activates the drive motor 225 of the hood drive mechanism 224 to cause the hood 208 to move to its first position at which the hood 208 exerts the downward first force on the dunnage 15. The controller 221 then causes the drive motor 183 to activate momentarily in a reverse direction, so that the first and second rollers 180, 182 exert an upstream force on the portion of the dunnage 15 located downstream of the first and second rollers 180, 182. The upstream force, in combination with the restraint of the dunnage 15 by the hood 208 and the support 210, cause the portion of the dunnage 15 upstream of the point of restraint to be drawn in the upstream direction across the teeth of the cutting portion 230, which is angled toward the downstream direction as shown in FIGS. 2-6. The resulting interaction between the teeth of the cutting portion 230 and the dunnage 15 severs the dunnage 15, with severed piece of dunnage 15A being retained by the hood 208 and the support 210 as discussed above. Depending on the mode in which the system 10 is operating, the hood 208 can remain in its first position (holding the piece of dunnage 15A) until the piece of dunnage 15A is retrieved by the operator or automated equipment. Alternatively, the controller 221 can cause the hood 208 to move to its third position so as to release the piece of dunnage 15A immediately after the piece of dunnage 15A has been cut.

In alternative embodiments, the cutting mechanism 200 can be configured to cut the dunnage 15 using devices other than the cutting blade 202. For example, the cutting mechanism 200 can be equipped with a wire, a laser, a knife, a guillotine cutter, etc., in lieu of the cutting blade 202.

The cutting process may leave small tags or other remnants of paper extending from the edges of the piece of dunnage 15A created by the severing of the piece 15A by the cutting mechanism 200. The relatively low gripping force exerted on the piece of dunnage 15A by the hood 208 and the support 210 while the hood 208 is in its second position can reduce the tendency for these remnants to be torn or otherwise separated from the piece of dunnage 15A when the piece 15A pulled from between the hood 208 and the support 210 as it is retrieved. These remnants, if torn off in large quantities, can litter the floor and other surfaces of the workstation, creating a safety hazard, and have the potential to jam or otherwise interfere with the proper operation of the hood 208 and other components of the dunnage conversion machine 60.

The controller 221 can be configured to cause the dunnage conversion machine 60 to operate in various modes selectable by the operator. The system 10 includes a human-machine interface 25, depicted in FIGS. 1 and 7. The human-machine interface 25 is communicatively coupled to the controller 221, and permits the operator to select the desired mode of operation of the system 10.

The system 10 also includes an input device that permits the operator to make additional operational inputs, discussed below. The input device is communicatively coupled to the controller 221 and is depicted in the FIG. 1 as a foot pedal 30. In alternative embodiments, the input device can be a pushbutton or other suitable device that permits the operator to provide a momentary or prolonged input to the controller 221. In other alternative embodiments, the inputs provided via the foot pedal 30 can be provided to the controller 221 via the human-machine interface 25 in lieu of, or in addition to the foot pedal 30.

The system 10 can be configured to operate in a first mode in which the controller 221 causes the dunnage conversion machine to advance the stock material 16 through the dunnage conversion machine, thereby converting the stock material 16 into the dunnage 15, as long as the input device is being actuated, i.e., as long as the foot pedal 30 is being pressed and held down by the operator. As discussed above, the controller 221 activates the drive motor 225 of the hood drive mechanism 224 so as to cause the hood 208 to remain in its third position as the dunnage 15 is being advanced. When the operator ceases actuating the input device, i.e., when the operator stops pressing the foot pedal 30, a tear cycle is conducted under which the cutting mechanism 200 severs the piece of dunnage 15A from the remainder of the newly produced dunnage 15 in the above noted manner.

After the piece of dunnage 15A has been severed, the controller 221 causes the drive motor 225 to deactivate and thus to cease exerting torque the hood 208. Upon the cessation of the torque, the hood 208 moves to the second position, and the severed piece of dunnage 15A remains trapped between the hood 208 and the support 210 as discussed above, until the severed piece 15A pulled from between the hood 208 and the support 210 by the operator or automated equipment. The operator thereafter can initiate another dispensing cycle by depressing the foot pedal 30.

The system 10 is configured to operate in a second operating mode that is substantially identical to the first operating mode, with the following exception. In the second operating mode, controller 221 causes the hood 208 to move to its third position upon completion of the cutting cycle, so that the newly produced piece of dunnage 15A is released and can fall freely, for example, into a storage bin or other provision located beneath the outlet 118 of the dunnage conversion machine 16.

The system 10 is configured to operate in a third operating mode in which pressing the foot pedal 30 for a short period of time, e.g., one to three seconds, results in the controller 221 causing the dunnage conversion machine 60 to dispense a pre-selected length of dunnage 15. The pre-selected length of dunnage 15 can be input by the operator by way of the human-machine interface 25. After the specified length is dispensed, the hood 208 is moved from its third to its first position, and the cutting cycle is performed to create the severed piece of dunnage 15A. Once the dunnage 15 has been severed to produce the piece 15A, the torque of the drive motor 225 of the hood drive mechanism 224 is set to zero (or otherwise is lowered), causing the hood 208 to move to its second position wherein the severed piece of dunnage 15A is held between the hood 208 and the support 210 until it is removed by the operator or automated equipment. In this operating mode, holding the foot pedal 30 down (instead of releasing it quickly) will result in the controller 221 overriding pre-selected length of dunnage and causing the dunnage conversion machine 60 to dispense the pieces of dunnage 15A until the foot pedal 30 is released (as in the first and second operating modes).

The system 10 is configured to operate in a fourth operating mode that is substantially identical to the third operating mode, with the following exception. In the fourth operating mode, the controller 221 causes the hood 208 to move to the third position upon completion of the cutting cycle, so that the newly produced piece of dunnage 15A is released and can fall freely, for example, into a storage bin located beneath the outlet 118 of the dunnage conversion machine 16.

The system 10 is configured to operate in a fifth operating mode in which a piece of dunnage 15A of pre-selected length is dispensed automatically from the dunnage conversion machine 60. The newly formed dunnage 15 is cut to produce the severed piece of dunnage 15A, and the piece of dunnage 15A is held by the hood 208 and the support 210, as in the first and third operating modes. Once the piece of dunnage 15A is removed from between the hood 208 and the support 210, as registered by the sensor 220, the controller 221 automatically initiates the subsequent dispense cycle in which the next pre-selected length of dunnage 15 is dispensed, with the hood 208 is in its third position.

The system 10 is configured to operate in a sixth operating mode in which holding the foot pedal 30 in its depressed position causes the dunnage system 10 to dispense a pre-selected length of dunnage 15, followed by a cutting cycle as described above. The controller 221 causes the hood 208 to move to the third position upon completion of the cutting cycle, so that the newly produced piece of dunnage 15A is released and can fall freely, for example, into a storage bin located beneath the outlet 118 of the dunnage conversion machine 16. The above sequence will repeat until the foot pedal 30 is released or the supply of stock material 16 is depleted.

In alternative embodiments, the system 10 can be configured to operate in modes in addition to, or in lieu of those described above. In other alternative embodiments, the system 10 can be configured to operate in some, but less than all of the above-described modes.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above-described embodiments. Rather, the scope of the present solution should be defined in accordance with the following claims and their equivalents.

What is claimed is:

1. A dunnage conversion machine, comprising:

a drive mechanism configured to deform a stock material into a continuous length of dunnage and to advance the continuous length of dunnage in a downstream direction;

a cutting device configured to sever a piece of dunnage from the continuous length of dunnage;

a first jaw configured to move between:

a first position at which the first jaw contacts the continuous length of dunnage and exerts a first force on the continuous length of dunnage, and a second position at which the first jaw exerts a second force on the severed piece of dunnage to retain the severed piece on the dunnage conversion machine, the second force being less than the first force; and a second jaw configured to support the severed piece of dunnage while the first jaw exerts the second force on the dunnage so that the first and second jaws pinch the severed piece to retain the severed piece on the dunnage conversion machine, wherein:

the first jaw and the second jaw each have a width transverse to the upstream and downstream directions, and the width of the second jaw is less than the width of the first jaw.

2. The dunnage conversion machine of claim 1, wherein the first jaw is configured so that the second position of the first jaw is adjustable.

3. A dunnage conversion machine, comprising:

a drive mechanism configured to deform a stock material into a continuous length of dunnage and to advance the continuous length of dunnage in a downstream direction;

a cutting device configured to sever a piece of dunnage from the continuous length of dunnage;

a jaw configured to move between:

a first position at which the jaw contacts the continuous length of dunnage and exerts a first force on the continuous length of dunnage, a second position at which the jaw exerts a second force on the severed piece of dunnage to retain the severed piece on the dunnage conversion machine, the second force being less than the first force, and a third position at which the jaw is substantially out of the path of the continuous length of dunnage to allow the continuous length of dunnage to advance in the downstream direction past the jaw; and a hood drive mechanism coupled to the jaw and configured to apply a hood-driving force to the jaw to move the jaw between the first and third positions.

4. The dunnage conversion machine of claim 3, wherein:

the first force prevents substantial movement of the continuous length of dunnage in an upstream direction while the continuous length of dunnage is being severed by the cutting device; and the second force is low enough to prevent tearing of the severed piece of dunnage when the severed piece of dunnage is removed from the dunnage conversion machine with the jaw in the second position.

5. The dunnage conversion machine of claim 4, wherein movement of the first jaw to the first position causes the continuous length of dunnage to wrap around the cutting device so that the continuous length of dunnage is severed by the cutting device in response to a force exerted by the drive mechanism on the continuous length of dunnage in the upstream direction.

6. The dunnage conversion machine of claim 5, wherein the first force is sufficient to prevent substantial movement of the continuous length of dunnage in the upstream direction while the continuous length of dunnage is being severed by the cutting device.

7. The dunnage conversion machine of claim 4, wherein the second force is low enough to reduce or eliminate separation of remnants of paper extending from edges of the severed piece of dunnage when the severed piece of dunnage is removed from the dunnage conversion machine.

8. The dunnage conversion machine of claim 4, wherein the jaw, when in the third position, is substantially out of the path of the continuous length of dunnage to allow of the continuous length of dunnage to advance in the downstream direction past the jaw without tearing.

9. The dunnage conversion machine of claim 3, wherein:

the jaw is configured to rotate between the first, second, and third positions; and the hood drive mechanism is configured so that the hood-driving force produces a torque that rotates the jaw between the first and third positions.

10. The dunnage conversion machine of claim 3, further comprising a controller communicatively coupled to the hood drive mechanism and configured to generate an output that, when received by the hood drive mechanism, causes the hood drive mechanism to apply the hood-driving force to the jaw.

11. The dunnage conversion machine of claim 10, wherein the controller is configured so that the hood drive mechanism does not apply the hood-driving force to the jaw when the jaw is in the second position.

12. The dunnage conversion machine of claim 11, wherein the second force is generated solely by a weight of the jaw.

13. The dunnage conversion machine of claim 10, further comprising:

a sensor communicatively coupled to the controller and configured to detect a presence of the severed piece of dunnage within a sensing field of the sensor; and the sensor is configured to generate an output when the severed piece of dunnage is removed from the sensing field of the sensor, wherein the output, when received by the controller, causes the controller to command the hood drive mechanism to apply the hood-driving force to move the jaw to the third position.

14. The dunnage conversion machine of claim 13, wherein the controller is configured to cause the dunnage conversion machine to:

in response to a user input, dispense the continuous length of dunnage to a specified length input previously to the controller with the jaw in the third position;

upon cessation of the user input, apply the hood-driving force move the jaw to the first position, and cause the drive mechanism to reverse to sever the continuous length of dunnage;

reduce the hood-driving force or set the hood-driving force to zero after the continuous length of dunnage has been severed so that the jaw moves from the first to the second position and thereby retains the severed piece of dunnage on the dunnage conversion machine; and in response to receiving the input from the sensor indicating that the severed piece of dunnage has been removed from the sensing field of the sensor, apply the hood-driving force to move the jaw to the third position, and dispense another continuous length of dunnage to the specified length input previously to the controller.

15. The dunnage conversion machine of claim 10, wherein the controller is configured to cause the dunnage conversion machine to:

in response to a user input, dispense the continuous length of dunnage with the jaw in the third position until the user ceases the input;

upon cessation of the user input, apply the hood-driving force move the jaw to the first position, and cause the drive mechanism to reverse to sever the continuous length of dunnage; and reduce the hood-driving force or set the hood-driving force to zero after the continuous length of dunnage has been severed so that the jaw moves from the first to the second position and thereby retains the severed piece of dunnage on the dunnage conversion machine.

16. The dunnage conversion machine of claim 10, wherein the controller is configured to cause the dunnage conversion machine to:

in response to a user input, dispense the continuous length of dunnage with the jaw in the third position until the user ceases the input;

upon cessation of the user input, apply the hood-driving force to move the jaw to the first position, and reverse the drive mechanism to sever the continuous length of dunnage; and apply the hood-driving force to move the jaw to the third position after the continuous length of dunnage has been severed to release the severed piece of dunnage from the dunnage conversion machine.

17. The dunnage conversion machine of claim 10, wherein the controller is configured to cause the dunnage conversion machine to:

in response to a user input, dispense the continuous length of dunnage to a specified length input previously to the controller with the jaw in the third position;

after the continuous length of dunnage has been dispensed to the specified length, apply the hood-driving force to move the jaw to the first position, and reverse the drive mechanism to sever the continuous length of dunnage; and reduce the hood-driving force or set the hood-driving force to zero after the continuous length of dunnage has been severed so that the jaw moves from the first to the second position and thereby retains the severed piece of dunnage on the dunnage conversion machine.

18. The dunnage conversion machine of claim 10, wherein the controller is configured to cause the dunnage conversion machine to:

in response to a user input, dispense the continuous length of dunnage to a specified length input previously to the controller with the jaw in the third position;

after the continuous length of dunnage has been dispensed to the specified length, apply the hood-driving force to move the jaw to the first position, and reverse the drive mechanism to sever the continuous length of dunnage; and apply the hood-driving force to move the jaw to the third position after the continuous length of dunnage has been severed to release the severed piece of dunnage from the dunnage conversion machine.

19. The dunnage conversion machine of claim 18, wherein the controller is configured to cause the dunnage conversion machine to:

in response to continuation of the user input, dispense a second continuous length of dunnage to the specified length input previously to the controller with the jaw in the third position;

after the second continuous length of dunnage has been dispensed to the specified length, apply the hood-driving force to move the jaw to the first position and reverse the drive mechanism to sever the second continuous length of dunnage; and apply the hood-driving force to move the jaw to the third position after the second continuous length of dunnage has been severed to release the severed piece of dunnage from the second continuous length of dunnage from the dunnage conversion machine.

20. The dunnage conversion machine of claim 3, wherein the jaw comprises a hood.

21. The dunnage conversion machine of claim 20, wherein the hood comprises a top portion, and a first and a second side portion extending from the top portion and having a generally perpendicular orientation in relation to the top portion.

22. A system, comprising:

the dunnage conversion machine of claim 3; and a supply of the stock material.

23. A method of converting dunnage, comprising:

providing a dunnage machine including a drive mechanism, and a jaw movable between a first position, a second position, and a third position;

deforming a stock material into a continuous length of dunnage and advancing the continuous length of dunnage in a downstream direction using the drive mechanism, while the jaw is in the third position at which the jaw permits the continuous length of dunnage to advance in the downstream direction past the jaw;

moving the jaw to the first position at which the jaw contacts the continuous length of dunnage and exerts a first force on the continuous length of dunnage that prevents substantial movement of the continuous length of dunnage in an upstream direction while the continuous length of dunnage is being severed by a cutting device; and subsequently releasing or reducing a force on the jaw so that the jaw moves to the second position at which the jaw exerts a second force on the severed piece of dunnage to retain the severed piece on the dunnage conversion machine, the second force being less than the first force.

24. The method of claim 23, further comprising removing the severed piece of dunnage from the dunnage conversion machine while the jaw is in the second position.

25. The method of claim 23, wherein subsequently releasing or reducing a force on the jaw comprises setting a hood-driving force exerted by a hood drive mechanism motor to approximately zero, the hood-driving force generated by the hood drive mechanism, the hood-drive mechanism configured to move the jaw between the first and third positions.

26. The method of claim 23, wherein the second force is generated solely by a weight of the jaw.

27. The method of claim 23, further comprising moving the jaw to the third position for a sufficient time to permit the severed piece dunnage to fall out of the dunnage conversion machine.

* * * * *